US009992320B2

(12) United States Patent
Schmehl et al.

(10) Patent No.: US 9,992,320 B2
(45) Date of Patent: *Jun. 5, 2018

(54) SIMPLIFIED CONTROL INPUT TO A MOBILE DEVICE

(71) Applicant: AT&T Intellectual Property I, L.P., Atlanta, GA (US)

(72) Inventors: Ian C. Schmehl, Allen, TX (US); James Leonard Cansler, Cedar Park, TX (US); Scott Anthony White, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/701,349

(22) Filed: Sep. 11, 2017

(65) Prior Publication Data

US 2017/0374191 A1 Dec. 28, 2017

Related U.S. Application Data

(63) Continuation of application No. 14/727,551, filed on Jun. 1, 2015, now Pat. No. 9,762,717, which is a continuation of application No. 12/645,182, filed on Dec. 22, 2009, now Pat. No. 9,047,052.

(51) Int. Cl.
| H04B 1/38 | (2015.01) |
| H04M 1/725 | (2006.01) |
| G06F 1/16 | (2006.01) |
| G06F 3/0346 | (2013.01) |
| G06F 3/0488 | (2013.01) |

(52) U.S. Cl.
CPC ...... *H04M 1/72533* (2013.01); *G06F 1/1643* (2013.01); *G06F 1/1694* (2013.01); *G06F 3/0346* (2013.01); *G06F 3/04883* (2013.01); *H04M 2250/12* (2013.01); *H04M 2250/22* (2013.01)

(58) Field of Classification Search
CPC ...... G06F 1/1643; G06F 1/694; G06F 3/0346; G06F 3/0483; H04M 2250/12; H04M 2250/22
See application file for complete search history.

(56) References Cited

U.S. PATENT DOCUMENTS

| 6,002,918 | A | 12/1999 | Heiman et al. |
| 6,078,335 | A | 6/2000 | Wong et al. |
| 6,144,378 | A | 11/2000 | Lee |
| 6,448,987 | B1 | 9/2002 | Easty et al. |
| 6,469,633 | B1 | 10/2002 | Wachter |

(Continued)

*Primary Examiner* — Dominic Rego
(74) *Attorney, Agent, or Firm* — Jackson Walker L.L.P.

(57) ABSTRACT

A method of operating a mobile device includes receiving, from a motion sensor, motion information indicative of mobile device motion, recognizing a motion pattern indicated by the motion information, identifying a particular function corresponding to the motion pattern, and determining whether the particular function comprises a function for remotely controlling a remotely controlled device. Responsive to determining the particular function is a function for remotely controlling a remotely controlled device, a remote control command corresponding to the particular function is wirelessly sent to the remotely controlled device. If the particular function is a function for remotely controlling a remotely controlled device, the particular function is executed via a wireless network.

20 Claims, 4 Drawing Sheets

(56) References Cited

U.S. PATENT DOCUMENTS

| | | |
|---|---|---|
| 6,687,453 B1 | 2/2004 | Sakamoto et al. |
| 6,741,242 B1 | 5/2004 | Itoh et al. |
| 6,847,778 B1 | 1/2005 | Vallone et al. |
| 7,212,835 B2 | 5/2007 | Manlyjarvi et al. |
| 7,450,114 B2 | 11/2008 | Anwar |
| 7,716,579 B2 | 5/2010 | Gunn et al. |
| 7,720,572 B2 | 5/2010 | Ziegler et al. |
| 7,761,801 B2 | 7/2010 | Park |
| 7,992,180 B2 | 8/2011 | Hayakawa |
| 8,717,149 B2 | 5/2014 | Gude et al. |
| 2001/0047488 A1 | 11/2001 | Verplaetse et al. |
| 2002/0115451 A1 | 8/2002 | Taniguchi et al. |
| 2003/0013485 A1 | 1/2003 | Jung |
| 2004/0242288 A1 | 12/2004 | Balle et al. |
| 2005/0009511 A1 | 1/2005 | Bostrom et al. |
| 2005/0038944 A1 | 2/2005 | Harada et al. |
| 2005/0143870 A1 | 6/2005 | Yoshio et al. |
| 2005/0273784 A1 | 12/2005 | Lee et al. |
| 2006/0046791 A1 | 3/2006 | Choi |
| 2006/0116137 A1 | 6/2006 | Jung |
| 2007/0074248 A1 | 3/2007 | Kim |
| 2007/0097832 A1 | 5/2007 | Koivisto et al. |
| 2007/0118241 A1 | 5/2007 | Rosenberg |
| 2007/0206024 A1 | 9/2007 | Rao |
| 2007/0265081 A1 | 11/2007 | Shimura et al. |
| 2007/0291009 A1 | 12/2007 | Wright et al. |
| 2008/0097759 A1 | 4/2008 | Whin |
| 2008/0117085 A1 | 5/2008 | Garfio et al. |
| 2008/0120030 A1 | 5/2008 | Yamada |
| 2008/0167002 A1 | 7/2008 | Kim et al. |
| 2008/0220761 A1 | 9/2008 | Jang |
| 2009/0005167 A1 | 1/2009 | Arrasvuori et al. |
| 2009/0112592 A1 | 4/2009 | Candelore |
| 2009/0160789 A1 | 6/2009 | Kreit et al. |
| 2009/0207075 A1 | 8/2009 | Riley et al. |
| 2009/0241038 A1 | 9/2009 | Izuno et al. |
| 2009/0289905 A1 | 11/2009 | Ahn |
| 2009/0298465 A1 | 12/2009 | Kim et al. |
| 2009/0298535 A1 | 12/2009 | Klein et al. |
| 2009/0316054 A1 | 12/2009 | Bailey |
| 2009/0326406 A1 | 12/2009 | Tan et al. |
| 2009/0327978 A1 | 12/2009 | Hamadene et al. |
| 2010/0001849 A1 | 1/2010 | Lee et al. |
| 2010/0035638 A1 | 2/2010 | Wu et al. |
| 2010/0041431 A1 | 2/2010 | Kim et al. |
| 2010/0052870 A1 | 3/2010 | King |
| 2010/0087165 A1 | 4/2010 | Kim et al. |
| 2010/0107054 A1 | 4/2010 | Park |
| 2010/0164909 A1 | 7/2010 | Momono |
| 2010/0205036 A1 | 8/2010 | Van Der Haar et al. |
| 2010/0227642 A1 | 9/2010 | Kim et al. |
| 2010/0235732 A1 | 9/2010 | Bergman |
| 2010/0253768 A1 | 10/2010 | El-Maraghi et al. |
| 2010/0306085 A1 | 12/2010 | Schmidt et al. |
| 2011/0019105 A1 | 1/2011 | Austin |
| 2011/0032424 A1 | 2/2011 | VanDuyn et al. |
| 2011/0061062 A1 | 3/2011 | Chu et al. |
| 2011/0133976 A1 | 6/2011 | Harris et al. |
| 2011/0300831 A1 | 12/2011 | Chin |
| 2014/0255025 A1 | 9/2014 | King |

SIMPLIFIED CONTROL INPUT TO A MOBILE DEVICE

This application is a continuation of U.S. patent application Ser. No. 14/727,551, filed Jun. 1, 2015, issuing as U.S. Pat. No. 9,762,717 on Sep. 12, 2017, which is a continuation of U.S. patent application Ser. No. 12/645,182, filed Dec. 22, 2009, issued as U.S. Pat. No. 9,047,052 on Jun. 2, 2015, the entirety of which are incorporated by reference herein.

BACKGROUND

Field of the Disclosure

The present disclosure relates to operating mobile devices and, more particularly, to control inputs to operate a mobile device.

Description of the Related Art

Mobile devices incorporate a variety of communication options. Many handheld mobile devices are equipped with a display configured to accept touch input from a user. The user interface displayed on a mobile device may be overly complex.

DESCRIPTION OF THE EXEMPLARY EMBODIMENTS

Figure 1:
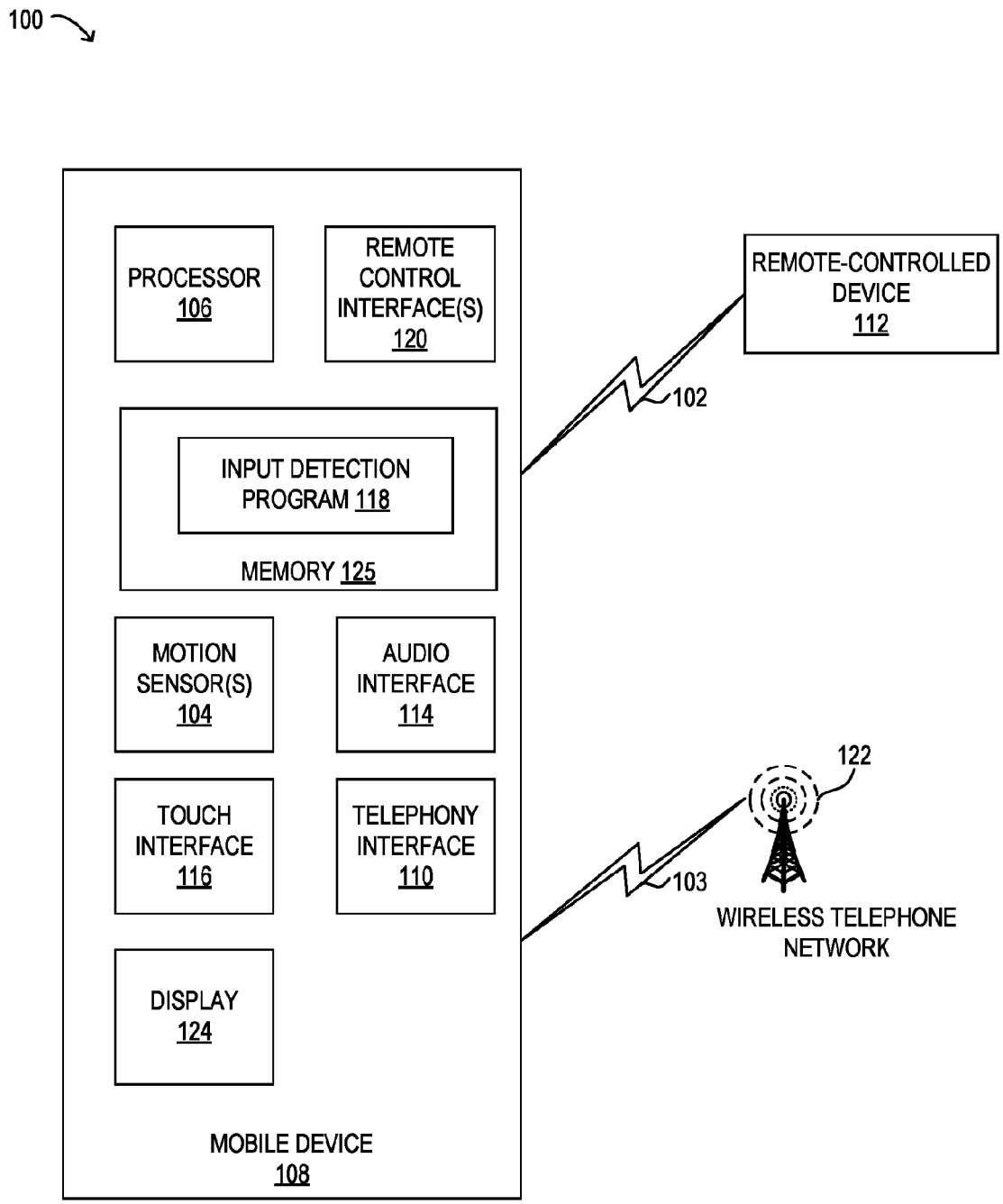
FIG. 1 is a block diagram of selected elements of an embodiment of a wireless system.

In one aspect, a disclosed method for controlling a mobile device having a wireless telephony interface includes interpreting first user input indicative of a two-dimensional pattern received through a touch interface of the mobile device, and executing a wireless communication command corresponding to the interpreted two-dimensional pattern. The two-dimensional pattern may be interpretable as at least one of: a polygon, an ellipse, a curve, and a line segment. At least a portion of the two-dimensional pattern may be interpretable as an alphanumeric character. The wireless communication command may include dialing a telephone number using the wireless telephony interface. The two-dimensional pattern may be associated with the telephone number.

In certain embodiments, the wireless communication command may include a remote control command for a remote-controlled device via a remote control interface included in the mobile device, while the two-dimensional pattern may be associated with the remote control command.

In given embodiments, the method may further include associating the wireless communication command with the two-dimensional pattern, in response to receiving second user input. The method may still further include interpreting third user input indicative of a motion detected by a motion sensor of the mobile device, and executing a wireless communication command corresponding to the detected motion.

In another aspect, a mobile device includes a processor, a wireless transceiver, a touch interface, and memory media accessible to the processor. The memory media may include instructions executable by the processor to detect a pattern traced by a user on the touch interface, and execute, using the wireless transceiver, a first wireless communication command corresponding to the detected pattern. The traced pattern may include at least one of: a polygon, an ellipse, a curve, a line segment, an alphanumeric character, and handwriting of the user.

In particular embodiments, the mobile device may be a mobile telephone and further include a telephony interface. The mobile device may further include a motion sensor, while the memory media may further include processor instructions executable to detect, using the motion sensor, a motion pattern of the mobile device, and execute a second wireless communication command corresponding to the detected motion pattern. The wireless transceiver may include a remote control interface. At least one of the first wireless communication command and the second wireless communication command may include a remote control command for a remote-controlled device via the remote control interface. The wireless transceiver may include a wireless telephony interface. At least one of the first wireless communication command and the second wireless communication command may include dialing a telephone number using the wireless telephony interface. At least one of the first user input and the second user input may be associated with the telephone number.

In various embodiments, the mobile device may further include a display device, while the memory media may further include processor instructions executable to display the traced pattern on the display device.

In a further aspect, a disclosed computer-readable memory media includes executable instructions for operating a mobile device. The instructions may be executable to interpret a user-defined pattern detected by at least one of a touch interface and a motion sensor included with the mobile device, and execute a wireless communication command corresponding to the user-defined pattern. The user-defined pattern may be interpretable as at least one of: a polygon, an ellipse, a curve, a line segment, an alphanumeric character, user handwriting, and a movement of the mobile device.

In certain embodiments, the memory media may include instructions executable to display the two-dimensional pattern using a display device included with the mobile device. The user-defined pattern may include a two-dimensional pattern traced by the user on the touch interface. Responsive to receiving user input, the memory media may further include instructions executable to associate the wireless communication command with the user-defined pattern. The wireless communication command may include dialing a telephone number using a wireless telephony interface included with the mobile device. The user-defined pattern may be associated with the telephone number.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Referring now to FIG. 1, a block diagram of selected elements of an embodiment of wireless system 100 are depicted. Wireless system 100 illustrates devices, interfaces and information that may be processed to operate mobile device 108. In particular, wireless system 100 depicts mobile device 108 configured to receive user input in simplified form, such as traced patterns on touch interface 116 and device motion detected by motion sensor(s) 104, as will be described in detail below.

In wireless system 100, remote-controlled device 112 represents any of a number of different types of devices that are remote-controlled, such as media players, televisions, or client-premises equipment (CPE) for multimedia content distribution networks (MCDNs), among others. As used herein, a "motion" or "motion pattern" refers to a particular motion, or sequences of motions, imparted to a mobile device by a user for the purpose of providing user input to the mobile device. The motion pattern may be a translation or a rotation or a combination thereof, in 2- or 3-dimensional space. Specific motion patterns may be defined and assigned to predetermined mobile device commands, such as telephony commands and/or remote-control commands. As further referred to herein, a "touch pattern" or a "traced pattern" or simply a "trace" refers to a pattern traced by a user on a touch interface. In particular embodiments, a touch pattern may be a two-dimensional pattern, and may include shapes such as a polygon, an ellipse, a curve, a line segment, or an alphanumeric character, among others.

As will be described in detail herein, mobile device 108 may be configured to detect user input and interpret the detected user input as an instruction to execute a wireless communication command. The user input may be a motion pattern and/or a touch pattern. The motion pattern may be a motion of mobile device 108 that is detected by motion sensor(s) 104. The touch pattern may be a two-dimensional pattern that is detected by touch interface 116.

In certain embodiments, the wireless communication command may involve sending, via a remote control interface, a remote control command executable by remote-controlled device 112. In other words, mobile device 108 may send command data, including remote control commands, to remote-controlled device 112. Upon receiving command data from mobile device 108, remote-controlled device 112 may execute a remote control function corresponding to the remote control command. In this manner, a user of wireless system 100 may be provided a simplified, yet flexible interface for operating remote-controlled device 112 using mobile device 108.

In various embodiments, the wireless communication command may involve a telephone command. The telephone command may involve using telephony interface 110 included with mobile device 108. In particular embodiments, the wireless communication command includes using mobile device 108 to dial a telephone number that is associated with the user input. Dialing a specific phone number in response to a single user input may be commonly referred to as "speed dialing." The telephone command may encompass other types of telephony commands, such as searching a phonebook, activating a speaker phone, accessing voicemail messages, etc.

As shown in FIG. 1, mobile device 108, which may be a hand-held and manually operated device, includes numerous elements, and may include additional elements (not shown in FIG. 1) in various embodiments. Mobile device 108 is shown including processor 106, remote control interface 120, memory 125, motion sensor(s) 104, audio interface 114, touch interface 116, and telephony interface 110. Memory 125 is depicted in FIG. 1 including input detection program 118. Accordingly, mobile device 108 may comprise elements configured to function as an embodiment of an electronic device capable of executing program instructions. Mobile device 108 may further include at least one shared bus (not shown in FIG. 1) for interconnectivity among internal elements, such as those depicted in FIG. 1.

Processor 106 may represent at least one processing unit and may further include internal memory, such as a cache for storing processor executable instructions. In certain embodiments, processor 106 serves as a main controller for mobile device 108. In various embodiments, processor 106 is operable to perform remote control operations, including input detection and related processing operations, as described herein.

In FIG. 1, remote control interface(s) 120 may represent a communications transceiver providing an interface for any of a number of communication links. In certain embodiments, remote control interface(s) 120 supports wireless communication links, such as infrared (IR), radio-frequency (RF), and audio, among others. Remote control interface(s) 120 may further support mechanically connected communication links to remote controls, such as galvanically wired connections, and may accordingly include a physical adapter or receptacle for receiving such connections. In FIG. 1, mobile device 108 is depicted communicating with remote-controlled device 112 via communication link 102. Communication link 102 may be a wireless or a mechanically connected interface, or some combination thereof. In one embodiment, remote control interface(s) 120 transforms an instruction for operating remote-controlled device 112 into a signal sent via communication link 102. It is noted that remote control interface(s) 120 may be a bidirectional interface, such that responses, such as commands, information, or acknowledgements, may be received from remote-controlled device 112 via communication link 102. In one embodiment, a message may be sent to remote-controlled device 112 and an acknowledgement of the message may be received from remote-controlled device 112.

Also in FIG. 1, memory 125 encompasses persistent and volatile media, fixed and removable media, magnetic and semiconductor media, or a combination thereof. Memory 125 is operable to store instructions, data, or both. Memory 125 as shown includes data, which may be in the form of sets or sequences of instructions, namely, input detection program 118. Input detection program 118 may include processor executable instructions to interpret user inputs, such as motion patterns and/or touch patterns, and, in response, execute wireless communication commands. Wireless communication commands may include remote control commands executable by remote-controlled device 112, and telephony commands, as described herein.

Mobile device 108, as depicted in FIG. 1, includes motion sensor(s) 104, which may be mechanically integrated into mobile device 108. Motion sensor(s) 104 may represent devices configured to detect linear translations, rotational translations, linear acceleration, rotational acceleration, or a combination thereof. For example, motion sensor(s) 104 may be configured to determine a spatial acceleration involving multiple axes of motion simultaneously. Motion sensor(s) 104 may include microelectromechanical systems (MEMS) or MEMS components, such as accelerometers, gyroscopes, or other types of motion sensors. It is noted that motion sensor(s) 104 may represent sensors configured to detect translation or rotation of mobile device 108 in multiple dimensions simultaneously.

In FIG. 1, mobile device 108 is shown including touch interface 116. In one embodiment, touch interface 116 may represent a touch sensitive screen installed on an exterior surface of mobile device 108. In certain implementations, touch interface 116 may be integrated into display 124 of mobile device 108, thereby allowing touch operation of user interface elements (not shown in FIG. 1) or virtual controls displayed on display 124. A user may operate touch interface 116 using direct interaction (e.g., with the user's finger) or using an instrument, such as a pen or other tool for tracing. Touch interface 116 may be configured to recognize and interpret certain patterns, and to send a corresponding notification to input detection program 118.

Also in FIG. 1, mobile device 108 is shown including audio interface 114. Audio interface 114 may represent at least one audio device, such as a speaker and/or microphone that is integrated in mobile device 108. In some embodiments, audio interface 114 represents an input/output port for an external audio device, such as an audio plug for connecting headphones, or an external microphone jack. In various embodiments, audio interface 114 represents an ear speaker and a microphone for providing telephone functionality using mobile device 108.

Further depicted in FIG. 1 is telephony interface 110, representing functional elements integrated into mobile device 108 for mobile telephony. Telephony interface 110 may include a wireless interface for using communication link 103 to communicate with wireless telephone network 122. Wireless telephone network 122 may represent an analog or digital wireless network supporting a cellular architecture. In certain embodiments, mobile device 108 may function as a cellular telephone using service provided by wireless telephone network 122. Telephony interface 110 may provide additional telephony functions, such as access to voice mail, a list of telephone contacts, text messaging, email, and multimedia messaging, among others.

In certain embodiments, mobile device 108 may further include display 124, which may represent a display device implemented as a liquid crystal display screen, a computer monitor, a television, a touch screen device, or the like. Display 124 may comply with a display standard for the corresponding type of display. Standards for computer monitors include analog standards such as video graphics array (VGA), extended graphics array (XGA), etc., or digital standards such as digital visual interface (DVI) or high-definition multimedia interface (HDMI), among others. A television display may comply with standards such as National Television System Committee (NTSC), Phase Alternating Line (PAL), or another suitable standard.

In operation, mobile device 108, after power-on, may be enabled to receive user input in the form of a motion pattern and/or a touch pattern. Display 124 may display an interpreted touch pattern detected by touch interface 116. Mobile device 108 may then execute a wireless communication command in response to receiving the user input. Input detection program 118 may further provide functionality to receive user input for assigning a motion pattern or a touch pattern to a wireless communication command. In one example, a simple shape, such as a triangle, may be associated with dialing a specific telephone number. When the shape is traced by the user on touch interface 116, mobile device 108 may then proceed to dial the specific telephone number. In another example, two shakes of mobile device 108 may be associated with a remote-control command to turn on remote-controlled device 112. When motion sensor(s) 104 detect the two shakes, mobile device 108 may proceed to send a remote control power-on command to remote-controlled device 112.

It is further noted that audio interface 114 may output audio signals corresponding to various events or actions performed using mobile device 108. For example, audio interface 114 may output an audio signal when the motion detector detects a motion pattern, thus providing audio feedback to the user that user input has been received. Audio interface 114 may further output another audio signal when a touch pattern is interpreted by touch interface 116, thus providing audio feedback to the user that user input has been received. Audio interface 114 may still further output yet another audio signal when remote-controlled device 112 acknowledges execution of a command associated with command data received by remote-controlled device 112, thus providing audio feedback to the user that a remote-control command was actually executed.

It is noted that the examples above are presented for descriptive purposes and do not limit potential implementations of the methods described herein. In fact, various combinations and permutations of user input and wireless communication commands may be practiced in different embodiments.

Figure 2:
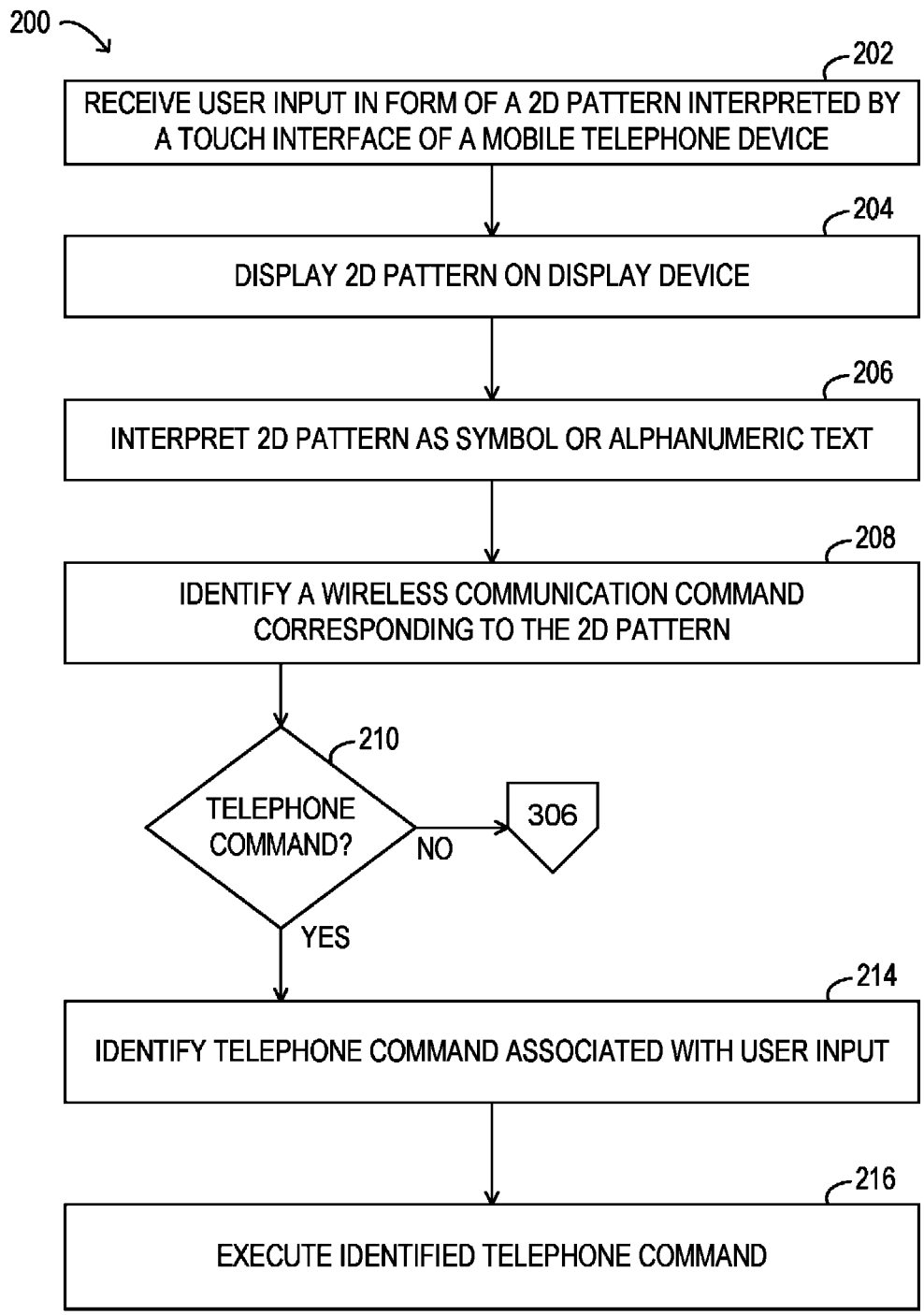
FIG. 2 illustrates an embodiment of a method for operating a mobile device.

Turning now to FIG. 2, an embodiment of method 200 for operating a mobile device is illustrated. In one embodiment, method 200 is performed by input detection program 118 executing on mobile device 108. It is noted that certain operations described in method 200 may be optional or may be rearranged in different embodiments.

Method 200 may begin by receiving user input in form of a two-dimensional pattern interpreted by a touch interface of a mobile telephone device (operation 202). The two-dimensional pattern may be displayed on a display device (operation 204). The two-dimensional pattern may be interpreted as a symbol or an alphanumeric input (operation 206). A wireless communication command corresponding to the two-dimensional pattern may be identified (operation 208). In one embodiment, touch interface 116 is configured to recognize a user's handwriting as alphanumeric input, which, in turn, may be used by input detection program 118 as an indication of a wireless communication command.

Method 200 may then proceed by making a decision whether the wireless communication command is a telephone command (operation 210). If the result of the decision in operation 210 is NO, then method 200 may proceed to operation 306 (see FIG. 3). If the result of the decision in operation 210 is YES, then a telephone command associated with the user input may be identified (operation 214). The telephone command may be executed (operation 216). The telephone command may be a speed dial command, such that a pre-determined telephone number associated with the two-dimensional pattern is automatically dialed and a telephone connection with the telephone number is established.

Figure 3:
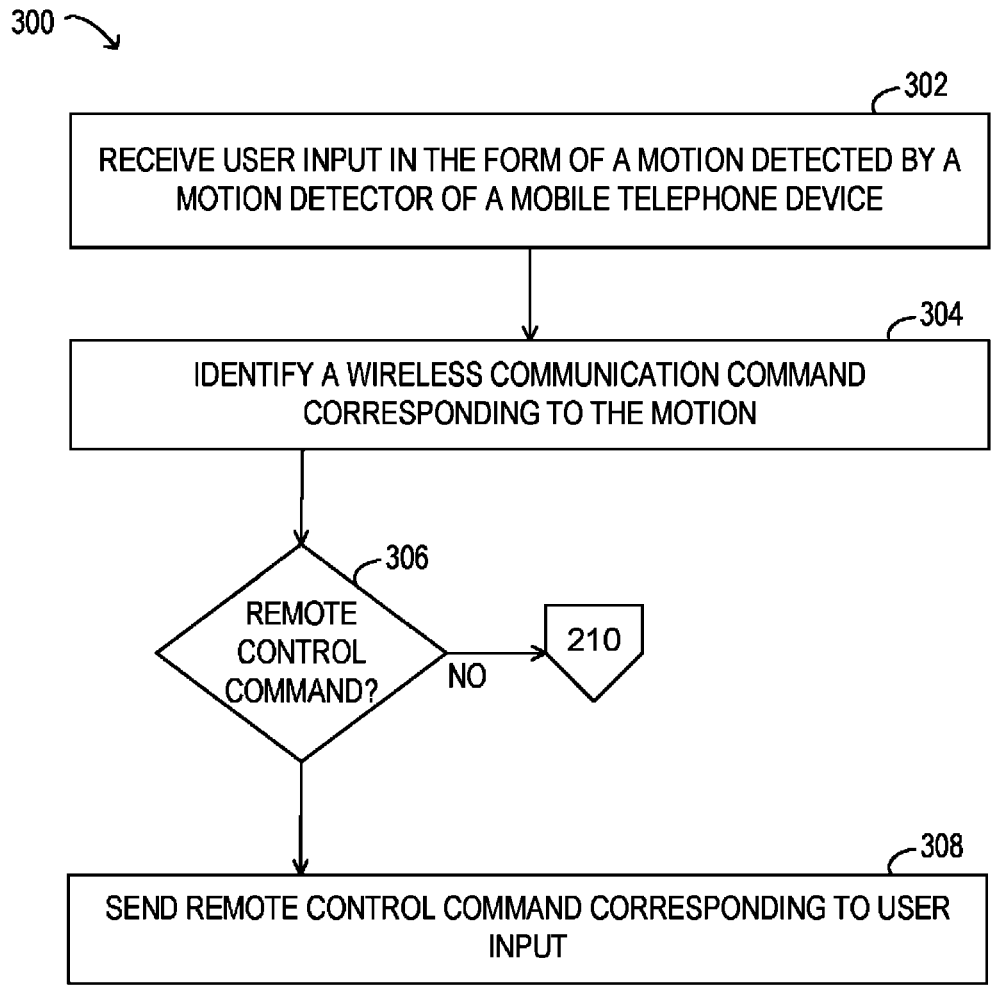
FIG. 3 illustrates an embodiment of a method for operating a mobile device.

Turning now to FIG. 3, an embodiment of method 300 for operating a mobile device is illustrated. In one embodiment, method 300 is performed by input detection program 118 executing on mobile device 108. It is noted that certain operations described in method 300 may be optional or may be rearranged in different embodiments.

Method 300 may begin by receiving user input in the form of a motion detected by a motion detector of a mobile telephone device (operation 302). In certain instances, a user of the mobile device may be prompted to provide the motion pattern. The user may create the motion pattern with translative or rotational body movements, which impart motion to the mobile device, for example, by holding the mobile device in the user's hand. A wireless communication command corresponding to the motion may be identified (operation 304). Next a decision may be made, whether the wireless communication command is a remote control command (operation 306). If the result of the decision in operation 306 is NO, then method 300 may proceed to operation 210 (see FIG. 2).

In method 300, if the result of the decision in operation 306 is YES, then a remote control command corresponding to the user input may be sent (operation 308). The motion pattern may be interpreted as a spatial pattern, and referenced to a list, or look-up-table, of known spatial patterns, which may, in turn, be correlated to specific wireless communication commands, such as remote control commands. For example, a sharp downwards movement may be interpreted as a 'pause' command. Other remote control commands may similarly be referenced to particular motion patterns. The remote control command may be encoded, encrypted, or otherwise transformed into a code interpretable and/or executable by a remote-controlled device.

Figure 4:
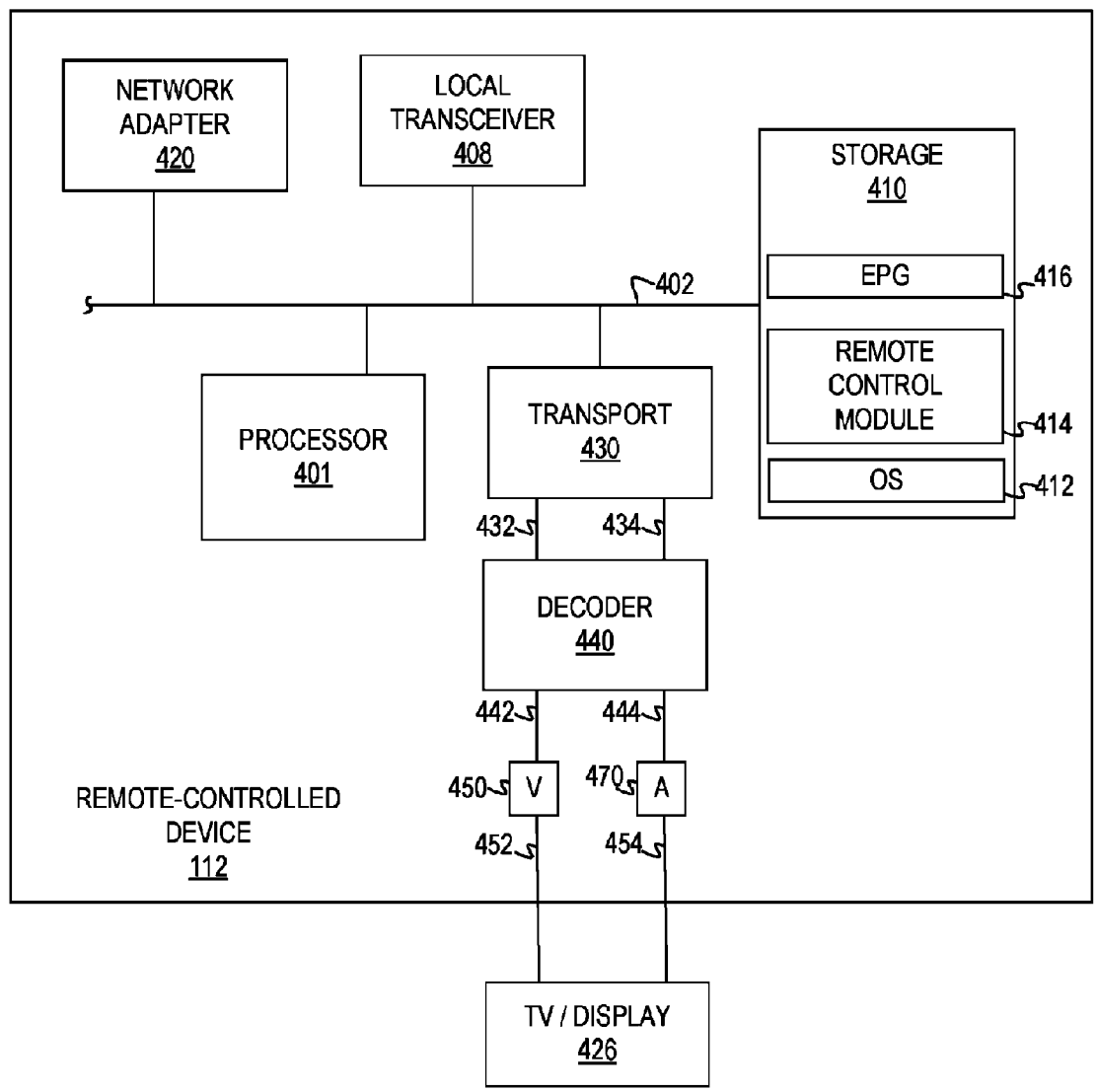
FIG. 4 is a block diagram of selected elements of an embodiment of a remote-controlled device.

Referring now to FIG. 4, a block diagram illustrating selected elements of an embodiment of remote-controlled device 112 is presented. As noted previously, remote-controlled device 112 may represent any of a number of different types of devices that are remote-controlled, such as media players, televisions, or CPE for MCDNs, among others. In FIG. 4, remote-controlled device 112 is shown as a functional component along with display 426, independent of any physical implementation, and may be any combination of elements of remote-controlled device 112 and display 426.

In the embodiment depicted in FIG. 4, remote-controlled device 112 includes processor 401 coupled via shared bus 402 to storage media collectively identified as storage 410. Remote-controlled device 112, as depicted in FIG. 4, further includes network adapter 420 that may interface remote-controlled device 112 to a local area network (LAN) through which remote-controlled device 112 may receive and send multimedia content (not shown in FIG. 4). Network adapter 420 may further enable connectivity to a wide area network (WAN) for receiving and sending multimedia content via an access network (not shown in FIG. 4).

In embodiments suitable for use in IP-based content delivery networks, remote-controlled device 112, as depicted in FIG. 4, may include transport unit 430 that assembles the payloads from a sequence or set of network packets into a stream of multimedia content. In coaxial-based access networks, content may be delivered as a stream that is not packet-based and it may not be necessary in these embodiments to include transport unit 430. In a coaxial implementation, however, tuning resources (not explicitly depicted in FIG. 4) may be required to "filter" desired content from other content that is delivered over the coaxial medium simultaneously and these tuners may be provided in remote-controlled device 112. The stream of multimedia content received by transport unit 430 may include audio information and video information and transport unit 430 may parse or segregate the two to generate video stream 432 and audio stream 434 as shown.

Video and audio streams 432 and 434, as output from transport unit 430, may include audio or video information that is compressed, encrypted, or both. A decoder unit 440 is shown as receiving video and audio streams 432 and 434 and generating native format video and audio streams 442 and 444. Decoder 440 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 440 may employ any of various audio decoding algorithms including Dolby® Digital, Digital Theatre System (DTS) Coherent Acoustics, and Windows Media Audio (WMA).

The native format video and audio streams 442 and 444 as shown in FIG. 4 may be processed by encoders/digital-to-analog converters (encoders/DACs) 450 and 470 respectively to produce analog video and audio signals 452 and 454 in a format compliant with display 426, which itself may not be a part of remote-controlled device 112. Display 426 may comply with NTSC, PAL or any other suitable television standard.

Storage 410 encompasses persistent and volatile media, fixed and removable media, and magnetic and semiconductor media. Storage 410 is operable to store instructions, data, or both. Storage 410 as shown may include sets or sequences of instructions, namely, an operating system 412, a remote control application program identified as remote control module 414, and electronic programming guide (EPG) 416. Operating system 412 may be a UNIX or UNIX-like operating system, a Windows® family operating system, or another suitable operating system. In some embodiments, storage 410 is configured to store and execute instructions provided as services by an application server via the WAN (not shown in FIG. 4).

EPG 416 represents a guide to multimedia content available for viewing using remote-controlled device 112, and may be shown to the user as an element of the user interface. The user interface may include a plurality of menu items arranged according to one or more menu layouts, which enable a user to operate remote-controlled device 112. The user may operate the user interface, including EPG 416, using mobile device 108 (see FIG. 1) in conjunction with remote control module 414. In some embodiments, EPG 416 may include an implementation of a remote control context, as described above.

Local transceiver 408 represents an interface of remote-controlled device 112 for communicating with external devices, such as mobile device 108 (see FIG. 1), or another remote control device. Local transceiver 408 may provide a mechanical interface for coupling to an external device, such as a plug, socket, or other proximal adapter. In some cases, local transceiver 408 is a wireless transceiver, configured to send and receive IR or RF or other signals. Local transceiver 408 may be accessed by remote control module 414 for providing remote control functionality.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A mobile device, comprising:
a processor;
a wireless transceiver;
a motion sensor;
a display; and
a memory, accessible to the processor, including processor-executable instructions that, when executed by the processor, cause the processor to perform operations comprising:
receiving, from the motion sensor, motion information indicative of mobile device motion;
recognizing a motion pattern indicated by the motion information;
identifying a particular function corresponding to the motion pattern;

determining whether the particular function comprises a first type of function, wherein the first type of function includes functions for remotely controlling a remotely controlled device;

responsive to determining the particular function is of the first type of function, wirelessly sending a remote control command corresponding to the particular function to the remotely controlled device; and responsive to determining the particular function is not of the first type of function, executing the particular function via a wireless network.

2. The mobile device of claim 1, wherein:
the motion sensor is configured to detect:
linear and rotational translations of the mobile device; and
linear and rotational acceleration of the mobile device; and
the motion sensor includes at least one of:
an accelerometer; and
a gyroscope.

3. The mobile device of claim 1, wherein the mobile device comprises a mobile phone and the wireless network comprises a digital cellular network.

4. The mobile device of claim 3, wherein the particular function comprises sending a text message.

5. The mobile device of claim 3, wherein the motion pattern is associated with a particular phone number and wherein the particular function comprises automatically calling, by the mobile phone, the particular phone number.

6. The mobile device of claim 1, wherein the remotely controlled device comprises a set top box and wherein the remote control command comprises a command for interacting with an electronic programming guide interface.

7. The mobile device of claim 1, wherein the remote control command comprises a power command to remotely control power provided to the remotely controlled device.

8. The mobile device of claim 1, further comprising:
an audio interface configured to output an audible signal, wherein the operations include:
responsive to recognizing the motion pattern, outputting, by the audio interface, an audible signal.

9. The mobile device of claim 8, wherein the operations include:
wirelessly receiving an acknowledgement of the remote control command from the remotely controlled device; and
outputting, by the audio interface, a second audible signal responsive to the acknowledgement of the remote control command.

10. The mobile device of claim 1, further comprising:
a touch interface for receiving touch input, wherein the operations include
receiving, from the touch interface, trace information indicative of a trace of the touch interface of the user input;
recognizing a trace pattern indicated by the motion information;
identifying a particular function corresponding to the trace pattern; an
performing the particular function responsive to detecting a particular trace pattern corresponding to a trace of finger of the user on a touch interface of-the mobile device.

11. A method of operating a mobile device, the method comprising:
receiving, from the motion sensor, motion information indicative of mobile device motion;

recognizing a motion pattern indicated by the motion information;
identifying a particular function corresponding to the motion pattern;
determining whether the particular function comprises a first type of function, wherein the first type of function includes functions for remotely controlling a remotely controlled device;
responsive to determining the particular function is of the first type of function, wirelessly sending a remote control command corresponding to the particular function to the remotely controlled device; and
responsive to determining the particular function is not of the first type of function, executing the particular function via a wireless network.

12. The mobile device method of claim 11, wherein:
the motion sensor is configured to detect:
linear and rotational translations of the mobile device; and
linear and rotational acceleration of the mobile device; and
the motion sensor includes at least one of:
an accelerometer; and
a gyroscope.

13. The mobile device method of claim 11, wherein the mobile device comprises a mobile phone and the wireless network comprises a digital cellular network.

14. The mobile device method of claim 13, wherein the particular function comprises sending a text message.

15. The mobile device method of claim 13, wherein the motion pattern is associated with a particular phone number and wherein the remote control command comprises automatically calling, by the mobile phone, the particular phone number.

16. The mobile device method of claim 11, wherein the remotely controlled device comprises a set top box and wherein the remote control command comprises a command for interacting with an electronic programming guide interface.

17. The mobile device method of claim 11, wherein the remote control command comprises a power command to remotely control power provided to the remotely controlled device.

18. The mobile device method of claim 11, further comprising:
responsive to recognizing the motion pattern, outputting, by an audio interface an audible signal.

19. The mobile device method of claim 18, further comprising:
wirelessly receiving an acknowledgement of the remote control command from the remotely controlled device; and
outputting, by the audio interface, a second audible signal responsive to the acknowledgement of the remote control command.

20. The mobile device method of claim 11, further comprising:
receiving, from a touch interface, trace information indicative of a trace of the touch interface of the user input;
recognizing a trace pattern indicated by the motion information;
identifying a particular function corresponding to the trace pattern; an
performing the particular function responsive to detecting a particular trace pattern corresponding to a trace of finger of the user on a touch interface of-the mobile device.

* * * * *